INVENTOR.
MORRIS H. STEVENS

BY Head & Johnson

ATTORNEYS

Feb. 6, 1968　　　M. H. STEVENS　　　3,367,365
VALVE

Filed May 25, 1966　　　　　　　　　　　　　　　　4 Sheets-Sheet 3

INVENTOR.
MORRIS H. STEVENS

BY Head & Johnson

ATTORNEYS

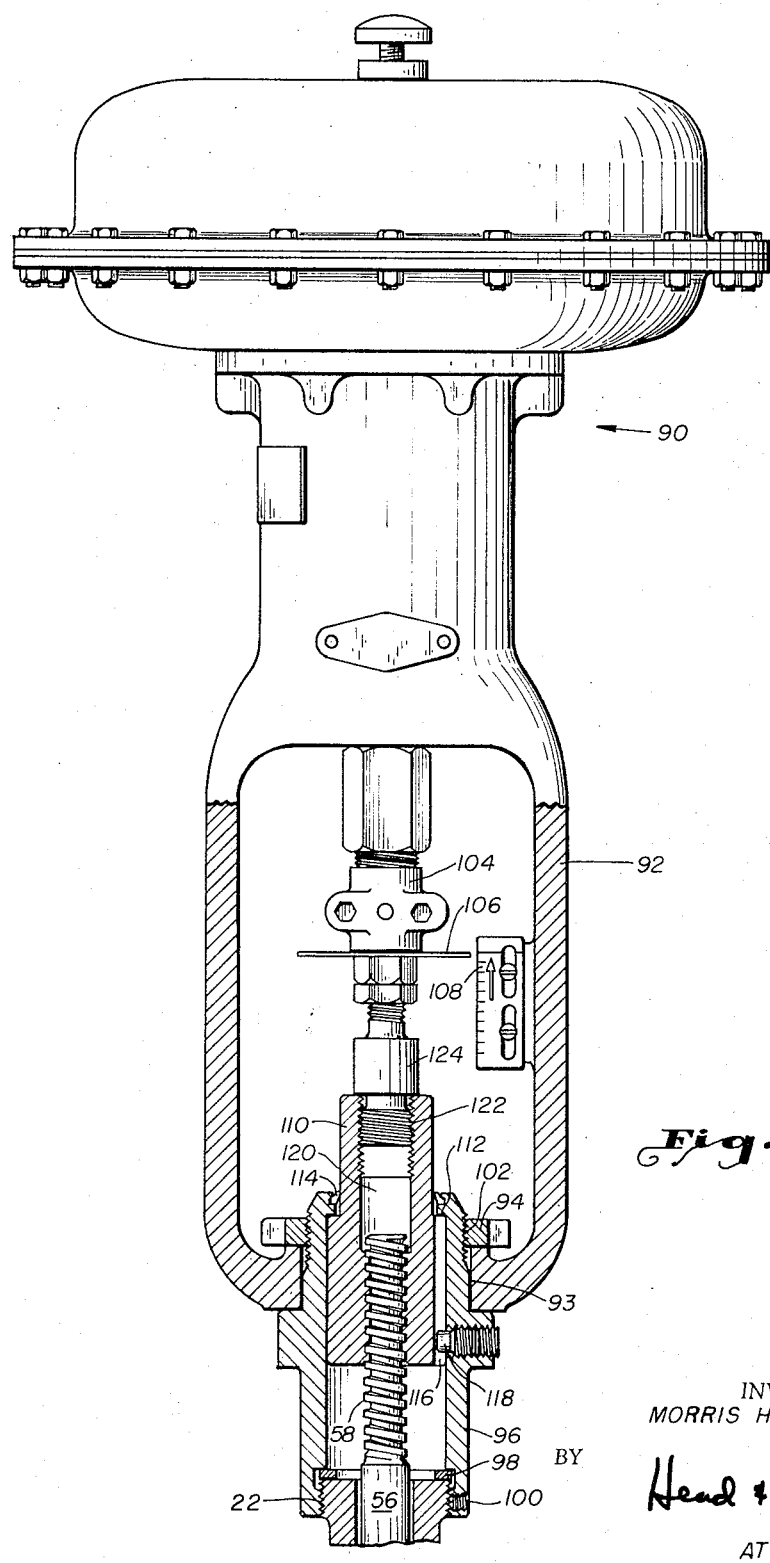

_United States Patent Office_ 3,367,365
Patented Feb. 6, 1968

3,367,365
VALVE
Morris H. Stevens, Little Rock, Ark., assignor to Orbit Valve Company, Little Rock, Ark., a corporation of Oklahoma
Filed May 25, 1966, Ser. No. 552,771
5 Claims. (Cl. 137—553)

This invention relates to a pneumatic or hydraulic actuator preferably of the diaphragm type for use as herein described with what are known as Orbit-type valves.

Orbit is a trademark of the Orbit Valve Company and an Orbit-type valve is defined for purposes herein as that type of valve operable by a valve stem which sequentially rotates and moves axially to respectively cause a valve core to rotate from a fully open position to a position where the core seating surface is opposite the valve seat, followed by a further movement, from the axial movement of the valve stem, which causes the valve core to pivot into seating and sealing engagement with the valve seat.

Due to the very nature of a valve stem, which not only rotates but moves axially for its required movement, the adaptation of a linearly moving pneumatic or hydraulic actuating device or adaption thereto has not been possible except for the device disclosed in prior Patent No. 3,207,468.

This invention has as its object the provision of a transducer having a linearly actuating mechanism for operation of the aforesaid Orbit-type valve. In addition, this invention provides as an object means for readily adapting known and commercially existing pneumatic or hydraulic actuating devices to an Orbit-type valve. In addition, the invention provides in conjunction with the actuating mechanism means for controlling other devices or mechanisms.

Figure 1:
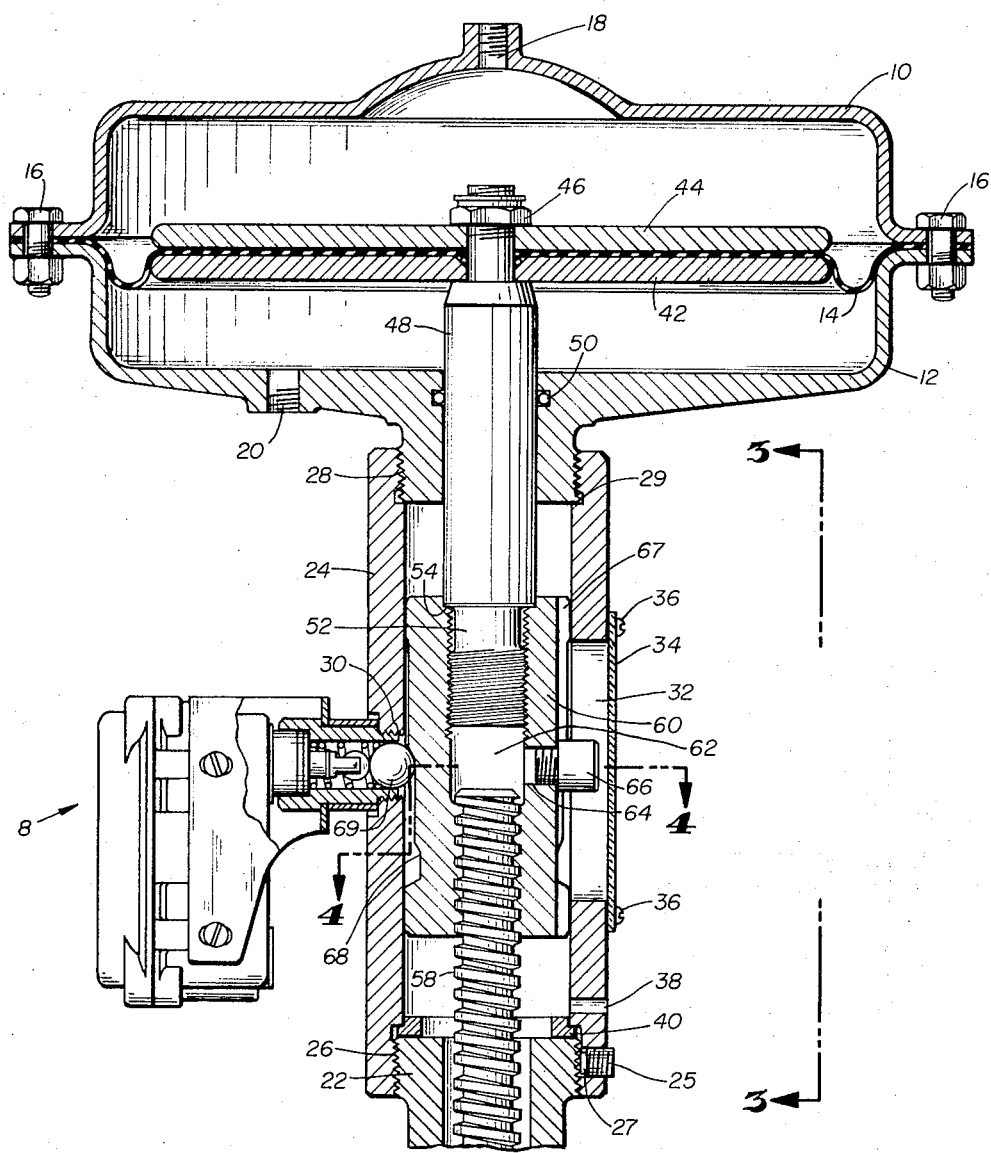
Figure 2:
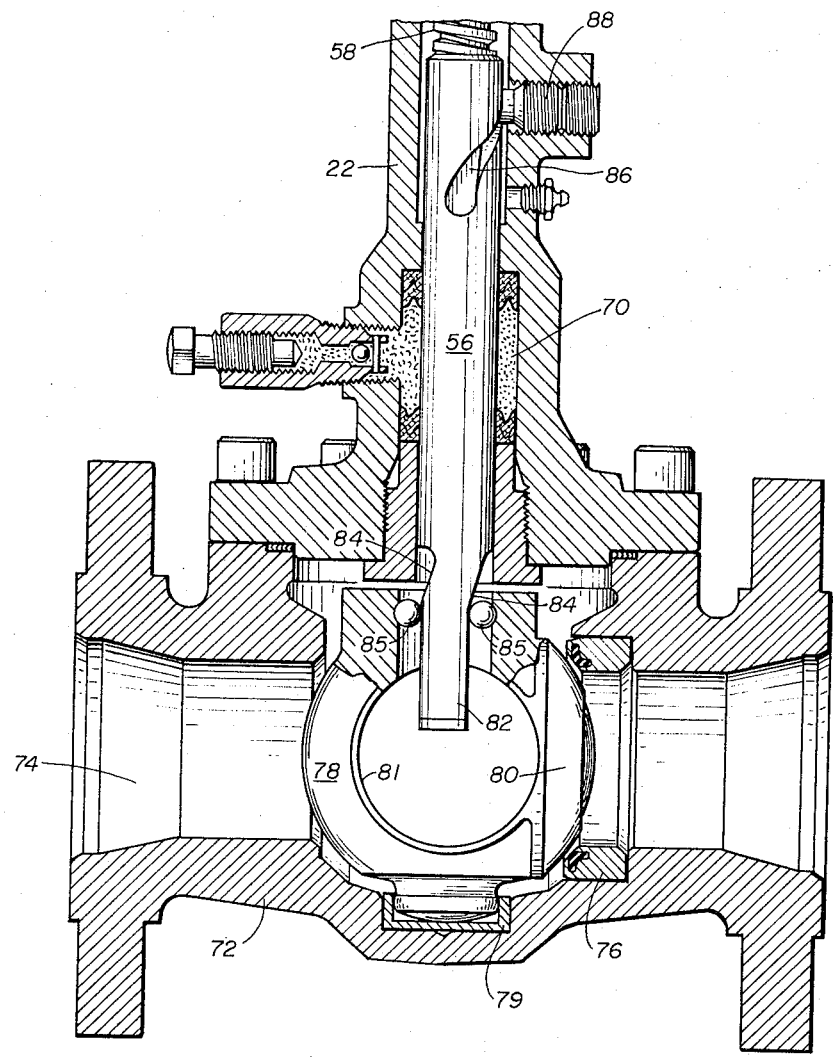
Figure 3:
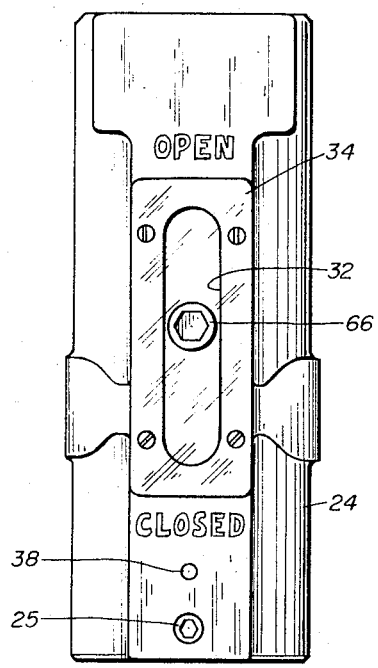
Figure 4:
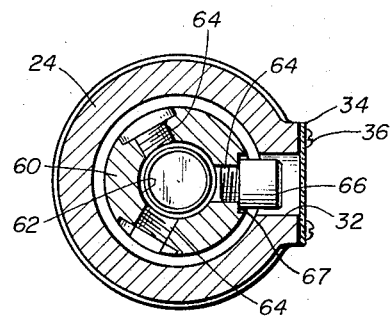

Referring now to the drawings, FIGURES 1 and 2 are sectional views of the combined actuator and valve, as assembled. FIGURE 3 is a frontal view of a portion of the actuator as viewed along the line 3—3 of FIGURE 1. FIGURES 5 and 6 are combined views depicting an additional embodiment of this invention incorporating a commercially available actuator with a valve of the type described herein.

Referring now to FIGURE 1, the actuator of this invention is depicted in combination with a micro-switch signal generating device, generally designated by the numeral 8. The actuator includes an upper diaphragm case 10 and a lower diaphragm case 12 with a flexible diaphragm 14 circumferentially retained therebetween by a plurality of bolts 16. The upper diaphragm case includes a fluid connection opening 18 usually used herewith for supplying pressure fluid to close the valve, whereas the lower case 12 includes opening 20 for pressure fluid to open the valve. These connections in turn are connected to suitable and well-known pneumatic or hydraulic pressure supply source. Between the top of valve body or bonnet 22 and the lower diaphrgam case 12 is a diaphragm housing sleeve adaptor 24 which is connected to each by respective threads 26 and 28 and locked by forcing brass plug 27 against the threads 26 by screw 25. The sleeve includes suitable opening or openings 30 for connection with instruments as, for instance, the micro-switch signal generator 8 or other instruments, as the case may be. In addition, the sleeve includes an indicator slot 32 having a transparent cover 34 thereover connected to the sleeve by screws 36. The sleeve further includes a relief opening 38 preventing any pressure fluid build-up within the interior of sleeve 24. In some instances spacer shims and/or washer 40 is utilized to properly seat the sleeve relative to the valve 22. Fluid pressure actuated linear force means includes diaphragm 14 and diaphragm plates 42 and 44 sandwiched together as shown by nut 46 upon the threaded end of the diaphragm stem member 48. An O-ring seal 50 is provided between the lower diaphragm case 12 and the reciprocable stem 48. The lower portion of the stem 48 terminates in a reduced diameter and threaded portion 52, creating a shoulder 54. The upper end of the valve stem 56 terminates with left-hand acme threads 58. Connecting between the diaphragm stem 48 and the threaded valve stem 58 is adaptor nut 60, which is preferably cylindrical, having an opening 62 axially therethrough, the upper portion of the opening terminating in matching threads for the reduced end 52 of the diaphragm stem 48, while the lower portion of the opening terminates in acme threads matching those of valve stem 58. Intermediate thereof and equally circumferentially spaced are three openings 64, one of which is aligned opposite indicator slot 32, and adapted to receive indicator guide bolt 66. The adaptor nut in this instance also includes a machined cam surface 68 for actuation of the micro-switch mechanism 8. The adaptor nut 60 also includes a longitudinal slot 67 which acts as a bypass opening to prevent trapping of any fluid during the travel of the adaptor nut.

Referring now to FIGURE 2, a typical Orbit-type valve is described so as to understand the operation of the actuator. The valve bonnet 22 includes an axial passageway for the valve stem 56 which includes suitable packing generally designated by the numeral 70. The bonnet 22 is bolted or welded to a valve body portion 72, which includes an axial opening 74 thereacross. Suitable valve seat mechanism 76 is provided for the seating of a valve core element 78, having a semi-spherical seating face 80 thereon. The valve core is actuated by the movement of valve stem 56 by reason of the interconnection with lower portion 82 of the stem, not only by its rotative movement but also by the axial movement of the stem 56 relative to the follower surface 84. Rotational movement of stem 56 is imparted by reason of spiral slot 86 relative to fixed stem guide 88, which has a follower portion within the slot 86, such that axial movement will impart rotative movement to the stem 56 in particular timed sequence depending upon the design and placement of slot 86 and stem guide 88.

Referring now to FIGURE 5, a commercially standard and available actuator element is depicted and generally designated by the numeral 90. The lower portion of the actuator terminates with a yoke 92, cylindrical portion 93, and threaded sleeve nut 94 for adaptation to a sleeve adaptor 96 which is threadably attached to the upper end of valve bonnet 22 utilizing spacer shims and/or washer 98 and retained by a plug and lockscrew 100, while the upper portion includes a recess for supporting the actuator yoke 92 and terminating with threads 102 to match sleeve nut threads 94. The diaphragm stem terminates from the actuator 104 into the yoke and includes visual indicator 106 and index 108. An adaptor nut 110 is provided for axial movement within the sleeve adaptor 96, the limits of its upper movement being held by shoulder 112. A wiper packing ring 114 prevents the accumulation of dirt, etc., within the sleeve adaptor. The adaptor nut includes a longitudinal slot 116 whereby in cooperation with the follower guide 118 the nut is prevented from rotating within the sleeve adaptor. Interiorly of the adaptor nut is an axial opening 120, the upper end of which terminates in a threaded portion 122 for reception of an actuating stem adaptor 124. The lower portion of the opening terminates with left-hand acme threads matching those of valve stem 56.

In the assembly, adaptor nut 60 is threadably attached to diaphragm stem member 48 until shoulder 54 is locked thereto. The valve stem 56 is positioned at its extreme upper position or that position wherein the valve is fully open. Spacer washer 40 is positioned atop the bonnet 22. Sleeve adaptor 24 is then threaded to the top of the bonnet until abutment with the washer 40. In some instances shims have been positioned between the washer 40 and on top of bonnet 22 in order that indicator slot and opening will become positioned at a particular attitude relative to the valve for operational or other purposes. The sleeve adaptor 24 is locked to the bonnet utilizing screw 25 with a soft brass locking plug 27 therebetween to prevent damage to threads 26. The unitized diaphragm stem member 48 and adaptor nut 60 are positioned within the sleeve adaptor and rotated to the left upon acme threads 58 of the valve stem 56. This is continued until the top of adaptor nut 60 is aligned with the shoulder 29. The assembly is then raised or rotated to the right for approximately one-third of a turn until the next opening 64 is in alignment with indicator slot 32. Thereupon travel guide 66 is threaded and seated into position. Lower diaphragm case 12 is threaded to sleeve adaptor 24 until it abuts shoulder 29, O-ring 50 having been inserted within its groove and greased prior thereto. Thereafter the remaining diaphragm elements are assembled beginning with diaphragm plate 42, followed by diaphragm 13, upper diaphragm plate 42, lock nut 46, followed by the positioning and bolting of upper diaphragm case 10. In the instance that switch 8 is utilized, this also is threaded into position in the manner shown and appropriately connected to the operating controls. Fluid pressure conduits are connected at 18 and 20 respectively and the valve and the actuator of this invention are ready for operation.

In operation, wherein the valve is about to be fully closed as in FIGURES 1 and 2, fluid pressure being applied through inlet 18 will cause the diaphragm 14 and its plates 42 and 44 to move downward. Since diaphragm stem member 48 is rigidly attached to the adaptor nut 60 by reason of shoulder 54 the full assembly including the adaptor nut will move downwardly. Since guide bolt 66 is within indicator slot 32, the adaptor nut 60 will not turn. Stem guide 88 being within the vertical portion of slot 86, the valve stem 56 will likewise move downwardly. The follower surfaces cooperating with the guides 85 cause valve core 78 to pivot within the core bushing 79 wherein seating surface 80 will engage with valve seat 76, stopping flow of fluid through the valve fluid passageway 74. To open the valve, pressure fluid is applied to the bottom of the diaphragm chamber through inlet 20 while fluid is exhausted in the upper part of the diaphragm chamber through opening 18. As such, the actuating assembly including the diaphragm 14, plates 42 and 44, stem member 48 and adaptor nut 60 will move upwardly. Again, due to the relationship of stem guide 88 within the vertical portion of slot 86, the valve core 78 is caused to pivot about bushing 79 in a counterclockwise direction to be removed from seating engagement with the valve seat 76. Upon further upper movement of the actuating assembly and by reason of stem guide 88 now entering the spiral portion of slot 86, a rotary movement is imparted to the valve stem 56 which is now imparted to the valve core 78 until opening 81 of the valve core is in axial alignment with the fluid passageway 74.

In those instances where a micro-switch signal generator device 8 is utilized, actuator ball 69 is adapted to be spring-biased into contact with cam surface 68. Depending upon the type of micro-switch, any combination of full-open, intermediate and full-closed positions are adapted to the design of the cam surface on the nut. Electrical signals therefrom are available for remote indication or operation of other equipment which may be tied in with the operation of the valve.

The invention has been described with reference to specific and preferred embodiments. It will be apparent, however, that the other modifications can be made without departing from the spirit and scope of the invention. Accordingly, this invention should be construed not to be limited to the embodiment herein described but should be limited only by the scope of the appended claims.

What is claimed:

1. In a valve including an upper end threaded valve stem, valve core and valve body, a guide slot and fixed stem follower means cooperatively situated relative to the stem and the body to permit both linear and/or rotary movement to actuate the valve core, the improvement comprising:

a transducer housing having a movable pressure fluid actuated linear force means, said housing affixedly attached to the top of said valve body coaxial with said valve stem upper end, said force means including an end adaptor threaded to match and receive said valve stem, and means to prevent rotation of said linear force means and adaptor relative to said housing.

2. In a valve according to claim 1, the improvement including a visual indicator slot in said housing to receive and vertically guide said means to prevent rotation and permit a visual indication of the valve position.

3. In a valve according to claim 1, the improvement including a cam surface on said adaptor, and a switch attached to said housing adjacent said adaptor, said switch actuated by a follower in contact with said cam surface.

4. A valve including an upper end threaded valve stem, valve core and valve body, a guide slot and fixed stem follower means cooperatively situated relative to the stem and the body to permit both linear and/or rotary movement to actuate the valve core comprising in combination:

a pressure fluid actuated transducer assembly to operat the valve, the assembly including a pressure responsive diaphragm or piston and a stem movable relative to a housing;

a sleeve adaptor affixedly attached to the top of the valve at one end and to the transducer housing at the other so as to be coaxial with the valve stem, the adaptor including a vertical indicator and guide slot; and an adaptor nut affixed to the end of the diaphragm stem, the nut including an inside threaded portion to match and rotatably receive the valve stem and three equally and circumferentially spaced threaded openings lying in the same plane positioned so that one of the openings is in alignment with the guide slot, a travel guide bolt in the one opening and within the guide slot to prevent rotation of the nut relative to the adaptor.

5. A valve including an upper end threaded valve stem, valve core and valve body, a guide slot and fixed stem follower means cooperatively situated relative to the stem and the body to permit both linear and/or rotary movement to actuate the valve core comprising in combination:

a pressure fluid actuated transducer assembly to operate the valve, the assembly including a pressure responsive diaphragm or piston and a stem movable relative to a housing;

a sleeve adaptor affixedly attached to the top of the valve at one end and to the transducer housing at the other so as to be coaxial with the valve stem, the adaptor including a vertical indicator and guide slot;
an adaptor nut affixed to the end of the diaphragm stem, the nut including an inside threaded portion to match and rotatably receive the valve stem, a vertical guide slot along the nut;
a guide attached to the sleeve adaptor and within the guide slot of the nut to prevent rotation of the nut relative to the housing and valve stem;
a wiper ring between the sleeve adaptor and adaptor nut; and
a visual indicator means to show the valve position.

References Cited

UNITED STATES PATENTS

| | | | |
|---|---|---|---|
| 1,639,743 | 8/1927 | Marscheider | 251—163 XR |
| 2,200,010 | 5/1940 | Orem | 137—505.47 XR |
| 2,334,826 | 11/1943 | Lowe | 137—554 XR |
| 3,183,926 | 5/1965 | Boudot | 137—556.3 XR |

FOREIGN PATENTS 1,354,188  1/1964  France.

HENRY T. KLINKSIEK, *Primary Examiner.*